(12) United States Patent
Bourne et al.

(10) Patent No.: US 10,479,511 B2
(45) Date of Patent: Nov. 19, 2019

(54) DIRECT CURRENT (DC) DEICING CONTROL SYSTEM, A DC DEICING SYSTEM AND AN AIRCRAFT INCLUDING A DC DEICING SYSTEM

(71) Applicant: Sikorsky Aircraft Corporation, Stratford, CT (US)

(72) Inventors: Frederick L. Bourne, Litchfield, CT (US); John Mihalakopoulos, Trumbull, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 854 days.

(21) Appl. No.: 15/044,645

(22) Filed: Feb. 16, 2016

(65) Prior Publication Data

US 2016/0236787 A1    Aug. 18, 2016

Related U.S. Application Data

(60) Provisional application No. 62/117,144, filed on Feb. 17, 2015.

(51) Int. Cl.
*H05B 1/02* (2006.01)
*B64D 15/12* (2006.01)

(52) U.S. Cl.
CPC ........... *B64D 15/12* (2013.01); *H05B 1/0236* (2013.01)

(58) Field of Classification Search
CPC .. B64D 15/12; H05B 1/0236; H05B 2214/02; H05B 3/0042; H05B 1/02
USPC ................................ 219/492, 497, 501, 494
See application file for complete search history.

(56) References Cited

U.S. PATENT DOCUMENTS

| | | | |
|---|---|---|---|
| 8,746,622 B2 | 6/2014 | Gallman et al. | |
| 9,725,179 B2 * | 8/2017 | Aubert | H02K 7/116 |
| 9,745,070 B2 * | 8/2017 | Brouwers | B64D 15/12 |
| 10,090,733 B2 * | 10/2018 | De Wergifosse | B64D 15/12 |
| 2009/0091187 A1 * | 4/2009 | Tardy | H02J 3/14 |
| | | | 307/38 |
| 2010/0298088 A1 * | 11/2010 | Rouis | B60K 6/485 |
| | | | 477/3 |
| 2014/0160818 A1 | 6/2014 | Garces et al. | |
| 2014/0197681 A1 * | 7/2014 | Iwashima | B60R 16/03 |
| | | | 307/9.1 |

* cited by examiner

*Primary Examiner* — Mark H Paschall
(74) *Attorney, Agent, or Firm* — Cantor Colburn LLP

(57) ABSTRACT

A direct current (DC) deicing control system including a direct current (DC) power source, and a periodic deicing waveform generator electrically connected to the DC power source. The periodic deicing waveform generator outputs a switched DC voltage having a periodic electrical current waveform including periods of zero voltage and periods of non-zero voltage. The periods of zero voltage define arc extinguishing events reducing arc formation in the DC deicing control system.

10 Claims, 2 Drawing Sheets

DIRECT CURRENT (DC) DEICING CONTROL SYSTEM, A DC DEICING SYSTEM AND AN AIRCRAFT INCLUDING A DC DEICING SYSTEM

CROSS-REFERENCE TO RELATED APPLICATIONS

This application claims priority to U.S. Provisional Patent Application No. 62/117,144 filed on Feb. 17, 2015. The contents of which are incorporated herein by reference.

BACKGROUND OF THE INVENTION

Exemplary embodiments pertain to the art of aircraft deicing systems and, more particularly, to a direct current (DC) deicing control system, a DC deicing system, and an aircraft including a DC deicing system.

Aircraft, both fixed wing and rotary wing, employ deicing systems on various external surfaces. Deicing systems may be mounted to fuselage panels, wing panels, or rotary blades and are operated to eliminate or at least reduce ice buildup. Typically, a deicing system will employ heaters that cause any built up ice to de-bond and be removed by aerodynamic forces during flight.

BRIEF DESCRIPTION OF THE INVENTION

Disclosed is a direct current (DC) deicing control system including a DC power source, and a periodic deicing waveform generator electrically connected to the DC power source. The periodic deicing waveform generator outputting a switched DC voltage having a periodic electrical current waveform including periods of zero voltage and periods of non-zero voltage. The periods of zero voltage define arc extinguishing events reducing arc formation in the DC deicing control system.

In addition to one or more of the features described above or below, or as an alternative, further embodiments could include wherein the periodic deicing waveform generator comprises a polyphase periodic waveform generator configured and disposed to deliver a plurality of circuit phases to at least one deicing mat, each of the plurality of circuit phases including a periodic electrical current waveform having periods of zero voltage and periods of non-zero voltage.

In addition to one or more of the features described above or below, or as an alternative, further embodiments could include wherein the periodic deicing waveform generator comprises a polyphase, phase shifting periodic deicing waveform generator configured and disposed to deliver a plurality of circuit phases to at least one deicing mat, each of the plurality of circuit phases including a periodic electrical current waveform having periods of zero voltage and periods of non-zero voltage, the periods of zero voltage for each of the plurality of circuit phases being off-set relative to the periods of zero voltage for others of the plurality of circuit phases.

In addition to one or more of the features described above or below, or as an alternative, further embodiments could include wherein the periodic deicing waveform generator comprises a polyphase, phase shaped periodic deicing waveform generator configured and disposed to deliver a plurality of circuit phases to at least one deicing mat, each of the plurality of circuit phases including a periodic electrical current waveform having periods of zero voltage and periods of non-zero voltage, each of the periods of zero voltage including a curvilinear profile.

In addition to one or more of the features described above or below, or as an alternative, further embodiments could include wherein the periodic deicing waveform generator comprises a polyphase, phase shaped periodic deicing waveform generator configured and disposed to deliver a plurality of circuit phases to at least one deicing mat, each of the plurality of circuit phases including a periodic electrical current waveform having periods of zero voltage and periods of non-zero voltage, each of the periods of non-zero voltage including a curvilinear profile.

Also disclosed is a direct current (DC) deicing system including at least one deicing mat, and a DC deicing control system operably connected to the deicing mat. The DC deicing control system having a DC power source and a periodic deicing waveform generator electrically connected to the DC power source and the deicing mat. The periodic deicing waveform generator outputting a switched DC voltage having a periodic electrical current waveform to the at least one deicing mat. The periodic electrical current waveform having periods of zero voltage and periods of non-zero voltage. The periods of zero voltage define arc extinguishing events reducing arc formation in the DC deicing control system.

In addition to one or more of the features described above or below, or as an alternative, further embodiments could include wherein the periodic deicing waveform generator comprises a polyphase periodic deicing waveform generator delivering a plurality of periodic phases to the at least one deicing mat, each of the plurality of periodic phases including a periodic electrical current waveform having periods of zero voltage and periods of non-zero voltage.

In addition to one or more of the features described above or below, or as an alternative, further embodiments could include wherein the periodic deicing waveform generator comprises a polyphase, phase shifting periodic deicing waveform generator delivering a plurality of circuit phases to the at least one deicing mat, each of the plurality of periodic phases including a periodic electrical current waveform having periods of zero voltage and periods of non-zero voltage, the periods of zero voltage for each of the plurality of circuit phases being off-set relative to the periods of zero voltage for others of the plurality of circuit phases.

In addition to one or more of the features described above or below, or as an alternative, further embodiments could include wherein the periodic deicing waveform generator comprises a polyphase, phase shaped periodic deicing waveform generator delivering a plurality of circuit phases to the at least one deicing mat, each of the plurality of circuit phases including a periodic electrical current waveform having periods of zero voltage and periods of non-zero voltage, each of the periods of zero voltage including a curvilinear profile.

In addition to one or more of the features described above or below, or as an alternative, further embodiments could include wherein the periodic deicing waveform generator comprises a polyphase, phase shaped periodic deicing waveform generator delivering a plurality of circuit phases to the at least one deicing mat, each of the plurality of circuit phases including a periodic electrical current waveform having periods of zero voltage and periods of non-zero voltage, each of the periods of non-zero voltage including a curvilinear profile.

Further disclosed is an aircraft including a fuselage, at least one deicing mat operably coupled to the fuselage, and a direct current (DC) deicing control system operably coupled to the deicing mat, the DC deicing control system having a DC power source, and a deicing waveform generator electrically connected to the DC power source and the at least one deicing mat. The deicing waveform generator outputting a switched DC voltage having a periodic electrical current waveform to the at least one deicing mat. The periodic electrical current waveform having periods of zero voltage and periods of non-zero voltage. The periods of zero voltage define arc extinguishing events reducing arc formation in the DC deicing control system In addition to one or more of the features described above or below, or as an alternative, further embodiments could include wherein the periodic deicing waveform generator comprises a polyphase periodic deicing waveform generator delivering a plurality of circuit phases to the at least one deicing mat, each of the plurality of circuit phases including a periodic electrical current waveform having periods of zero voltage and periods of non-zero voltage.

In addition to one or more of the features described above or below, or as an alternative, further embodiments could include wherein the periodic deicing waveform generator comprises a polyphase, phase shifting periodic deicing waveform generator delivering a plurality of circuit phases to the at least one deicing mat, each of the plurality of circuit phases including a periodic electrical current waveform having periods of zero voltage and periods of non-zero voltage, the periods of zero voltage for each of the plurality of circuit phases being off-set relative to the periods of zero voltage for others of the plurality of circuit phases.

In addition to one or more of the features described above or below, or as an alternative, further embodiments could include wherein the periodic deicing waveform generator comprises a polyphase, phase shaped periodic deicing waveform generator delivering a plurality of circuit phases to the at least one deicing mat, each of the plurality of circuit phases including a periodic electrical current waveform having periods of zero voltage and periods of non-zero voltage, each of the periods of zero voltage including a curvilinear profile.

In addition to one or more of the features described above or below, or as an alternative, further embodiments could include wherein the periodic deicing waveform generator comprises a polyphase, phase shaped periodic deicing waveform generator delivering a plurality of circuit phases to the at least one deicing mat, each of the plurality of circuit phases including a periodic electrical current waveform having periods of zero voltage and periods of non-zero voltage, each of the periods of non-zero voltage including a curvilinear profile.

In addition to one or more of the features described above or below, or as an alternative, further embodiments could include wherein the aircraft comprises a rotary wing aircraft including at least one rotor assembly operably connected to the fuselage.

In addition to one or more of the features described above or below, or as an alternative, further embodiments could include wherein the at least one deicing mat is operably mounted to at least one rotor blade of the at least one rotor assembly.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
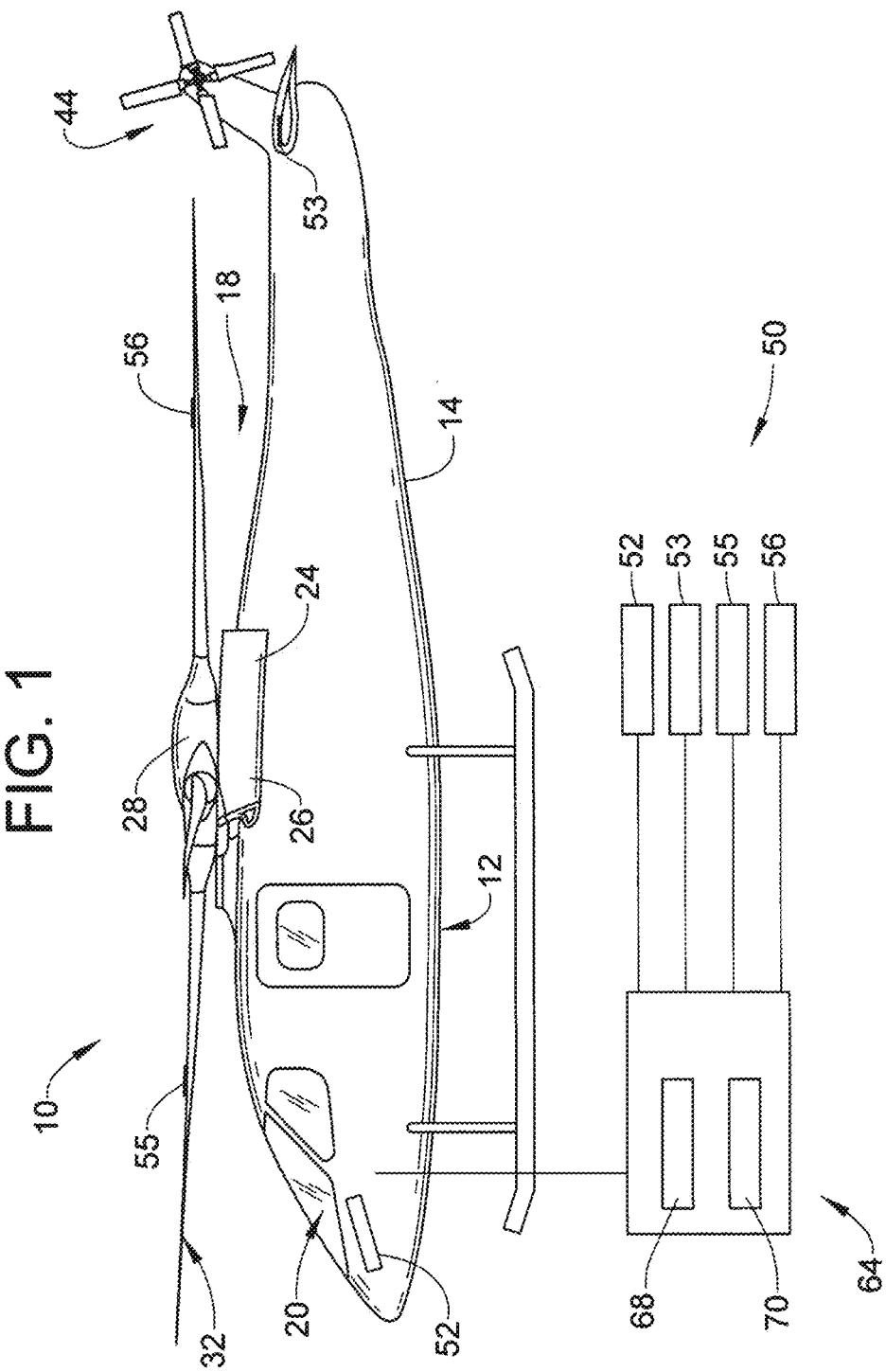
FIG. 1 depicts a rotary wing aircraft including a direct current (DC) deicing system, in accordance with an exemplary embodiment.

FIG. 1 depicts an exemplary embodiment of a rotary wing, vertical takeoff and land (VTOL) aircraft 10. The aircraft 10 includes an airframe or fuselage 12 with an extending tail 14. A main rotor assembly 18 is located at the fuselage 12 and rotates about a main rotor axis (not shown). In an exemplary embodiment, the fuselage 12 includes a cockpit 20 having two seats for flight crew (e.g., pilot and co-pilot) and six seats for passengers (not shown). Main rotor assembly 18 is driven by a power source, for example, one or more engines 24, via a gearbox 26. Main rotor assembly 18 includes a rotor hub 28 that supports a plurality of rotor blades, one of which is indicated at 32. Aircraft 10 may also include a tail rotor assembly 44 supported by extending tail 14.

In accordance with an aspect of an exemplary embodiment, aircraft 10 includes a direct current (DC) deicing system 50. DC deicing system 50 includes a first deicing mat 52 arranged on fuselage 12 near cockpit 20 and a second deicing mat 53 arranged on fuselage 12 near tail 14. Further deicing mats 55 and 56 may be applied to surfaces of rotor blades 32. DC deicing system 50 also includes a DC deicing control system 64 having a DC power source 68 and a periodic deicing waveform generator 70. As will be detailed more fully below, periodic deicing waveform generator 70 may selectively deliver a periodic electrical current to each deicing mat 52, 53 and 55, 56. Of course, it should be understood that the number and location of the deicing mats may vary.

Figure 2:
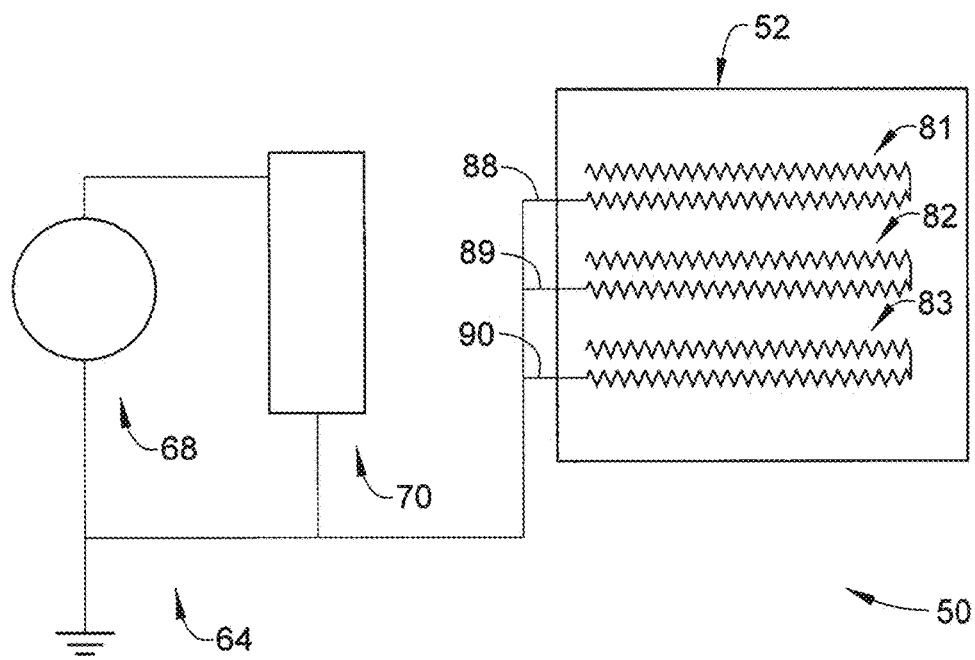
FIG. 2 depicts a block diagram illustrating a DC deicing controller and periodic deicing waveform generator of the deicing system of FIG. 1.

As shown in FIG. 2, deicing mat 52 includes a first heater coil 81, a second heater coil 82 and a third heater coil 83. Heater coils 81-83 are electrically coupled to DC power source 68 through periodic deicing waveform generator 70. In accordance with an aspect of an exemplary embodiment periodic deicing waveform generator 70 takes the form of a polyphase periodic deicing waveform generator delivering a periodic electrical current waveform to each heater coil 81-83. In accordance with another aspect of an exemplary embodiment, periodic deicing waveform generator 70 delivers a first electrical current waveform 88 to heater coil 81, a second electrical current waveform 89 to heater coil 82, and a third electrical current waveform 90 to heater coil 83. Each of the first, second and third electrical current waveforms 88, 89 and 90 represent a switched DC waveform having defined periods of zero voltage.

Figure 3:
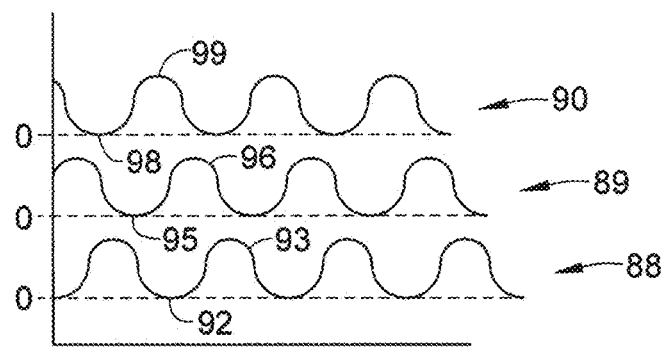
FIG. 3 depicts a polyphase, shifted and shaped DC output from the periodic deicing system of FIG. 2.

As shown in FIG. 3, first electrical current wave form 88 includes a plurality of periods of zero voltage 92 and a plurality of periods of non-zero voltage 93. Similarly, second electrical current wave form 89 includes a plurality of periods of zero voltage 95 and a plurality of periods of non-zero voltage 96, and third electrical current waveform 90 includes a plurality of periods of zero voltage 98 and a plurality of periods of non-zero voltage 99. In accordance with another aspect of an exemplary embodiment, periodic deicing waveform generator 70 takes the form of a phase shifting periodic deicing waveform generator. More specifically, periods of zero voltage 92 are off-set relative to periods of zero voltage 95, 98 and periods of non-zero voltage 93 are off-set relative to periods of non-zero voltage 96 and 99. Further periods of zero voltage 95 are off-set relative to periods of zero voltage 92, 98 and periods of non-zero voltage 96 are off-set relative to periods of non-zero voltage 93 and 99. By shifting the periods of zero voltage relative to other periods of zero voltage and periods of non-zero voltage relative to other periods of non-zero voltage, DC deicing waveform generator 70 produces a more uniform loading from DC power source 68.

In accordance with another aspect of an exemplary embodiment, periodic deicing waveform generator 70 takes the form of a wave shaping periodic waveform generator. More specifically, each electrical waveform 88-90 includes a generally curvilinear profile. More specifically, each of the periods of zero voltage 92, 95 and 98 include a curvilinear profile, and each of the periods of non-zero voltage 93, 96, and 99 include a curvilinear profile. By removing sharp corners typically associated with DC waveforms, periodic deicing waveform generator 70 creates a polyphase waveform which reduces any potential or tendency for arcing. Further, outputting a switched DC waveform having periods of zero voltage every cycle, would be rapidly extinguish any arcs that may form. More specifically, a zero crossing for each period will provide an arc extinguishing event, e.g., a defined period of zero voltage, once per cycle thereby resulting in fewer arcs being formed and or propagated.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A direct current (DC) deicing control system comprising:
    a direct current (DC) power source; and
    a periodic deicing waveform generator electrically connected to the DC power source, the periodic deicing waveform generator outputting a switched DC voltage having a periodic electrical current waveform including periods of zero voltage and periods of non-zero voltage, the periods of zero voltage defining arc extinguishing events reducing arc formation in the DC deicing control system.

2. The DC deicing control system according to claim 1, wherein the DC deicing waveform generator comprises a polyphase periodic deicing waveform generator configured and disposed to deliver a plurality of circuit phases to at least one deicing mat, each of the plurality of circuit phases including a periodic electrical current waveform having periods of zero voltage and periods of non-zero voltage.

3. The DC deicing control system according to claim 2, wherein the periodic deicing waveform generator comprises a polyphase, phase shifting periodic deicing waveform generator configured and disposed to deliver a plurality of circuit phases to at least one deicing mat, each of the plurality of circuit phases including a periodic electrical current waveform having periods of zero voltage and periods of non-zero voltage, the periods of zero voltage for each of the plurality of circuit phases being off-set relative to the periods of zero voltage for others of the plurality of circuit phases.

4. The DC deicing control system according to claim 3, wherein the periodic deicing waveform generator comprises a polyphase, phase shaped periodic deicing waveform generator configured and disposed to deliver a plurality of circuit phases to at least one deicing mat, each of the plurality of circuit phases including a periodic electrical current waveform having periods of zero voltage and periods of non-zero voltage, each of the periods of zero voltage including a curvilinear profile.

5. The DC deicing controller according to claim 4, wherein the periodic deicing waveform generator comprises a polyphase, phase shaped periodic deicing waveform generator configured and disposed to deliver a plurality of circuit phases to at least one deicing mat, each of the plurality of circuit phases including a periodic electrical current waveform having periods of zero voltage and periods of non-zero voltage, each of the periods of non-zero voltage including a curvilinear profile.

6. A direct current (DC) deicing system comprising:
    at least one deicing mat; and
    a direct current (DC) deicing control system operably coupled to the deicing mat, the DC deicing control system including a DC power source, and a periodic deicing waveform generator, the periodic deicing waveform generator outputting a switched DC voltage having a periodic electrical current waveform to the at least one deicing mat, the periodic electrical current waveform including periods of zero voltage and periods of non-zero voltage, the periods of zero voltage defining arc extinguishing events reducing arc formation in the DC deicing control system.

7. The DC deicing system according to claim 6, wherein the periodic deicing waveform generator comprises a polyphase periodic deicing waveform generator delivering a plurality of circuit phases to the at least one deicing mat, each of the plurality of circuit phases including a periodic electrical current waveform having periods of zero voltage and periods of non-zero voltage.

8. The DC deicing system according to claim 7, wherein the periodic deicing waveform generator comprises a polyphase, phase shifting periodic deicing waveform generator delivering a plurality of circuit phases to the at least one deicing mat, each of the plurality of circuit phases including a periodic electrical current waveform having periods of zero voltage and periods of non-zero voltage, the periods of zero voltage for each of the plurality of circuit phases being off-set relative to the periods of zero voltage for others of the plurality of circuit phases.

9. The DC deicing system according to claim 8, wherein the periodic deicing waveform generator comprises a polyphase, phase shaped periodic deicing waveform generator delivering a plurality of circuit phases to the at least one deicing mat, each of the plurality of circuit phases including a periodic electrical current waveform having periods of zero voltage and periods of non-zero voltage, each of the periods of zero voltage including a curvilinear profile.

10. The DC deicing system according to claim 9, wherein the periodic deicing waveform generator comprises a polyphase, phase shaped periodic deicing waveform generator delivering a plurality of circuit phases to the at least one deicing mat, each of the plurality of circuit phases including a periodic electrical current waveform having periods of zero voltage and periods of non-zero voltage, each of the periods of non-zero voltage including a curvilinear profile.

* * * * *